(12) United States Patent
Ratzel

(10) Patent No.: US 6,873,615 B2
(45) Date of Patent: Mar. 29, 2005

(54) METHOD AND SYSTEM FOR DATA TRANSMISSION IN A WIRELESS NETWORK

(75) Inventor: David G. Ratzel, Decatur, GA (US)

(73) Assignee: Cirronet Inc., Norcross, GA (US)

(*) Notice: Subject to any disclaimer, the term of this patent is extended or adjusted under 35 U.S.C. 154(b) by 850 days.

(21) Appl. No.: 09/815,471

(22) Filed: Mar. 23, 2001

(65) Prior Publication Data

US 2001/0036169 A1 Nov. 1, 2001

Related U.S. Application Data

(60) Provisional application No. 60/191,723, filed on Mar. 24, 2000.

(51) Int. Cl.$^7$ .............................. H04Q 7/24; H04L 7/00
(52) U.S. Cl. ...................... 370/349; 370/338; 370/345; 370/394; 455/432.1; 709/236
(58) Field of Search ................................ 370/230, 338, 370/349, 345, 394, 445; 455/432.1, 450; 709/236; 714/748

(56) References Cited

U.S. PATENT DOCUMENTS

| | | | |
|---|---|---|---|
| 5,123,111 A | 6/1992 | Delory et al. | |
| 5,163,054 A | 11/1992 | Nagy | |
| 5,371,734 A | * 12/1994 | Fischer | 370/311 |
| 5,724,515 A | 3/1998 | Barnes et al. | |
| 6,240,464 B1 | 5/2001 | Fijolek et al. | |
| 6,535,716 B1 | * 3/2003 | Reichman et al. | 455/12.1 |

FOREIGN PATENT DOCUMENTS

| | | |
|---|---|---|
| EP | 0883266 A2 * | 9/1988 |
| EP | 0 854 599 A2 | 7/1998 |
| EP | 0883 266 A2 | 12/1998 |

* cited by examiner

Primary Examiner—Afsar Qureshi
(74) Attorney, Agent, or Firm—Wallenstein Wagner & Rockey, Ltd.

(57) ABSTRACT

A method and apparatus for a wireless communication network. The network utilizing time-division-multiple-access (TDMA) and being configured in a star layout having a base station and at least one remote station. A packet frame having a header, a trailer and a packet is transmitted and received throughout the communication network. The packet is defined to support a registration mechanism for controlling access of remote stations into and out of the network and supporting retransmission of defective or lost packets.

11 Claims, 4 Drawing Sheets

REG, REN AND GRANT PACKET FORMATS.

STAR CONFIGURATION
RADIO NETWORK
(BASE AND N REMOTES)

BCAST, ACK AND DATA PACKET FORMATS.

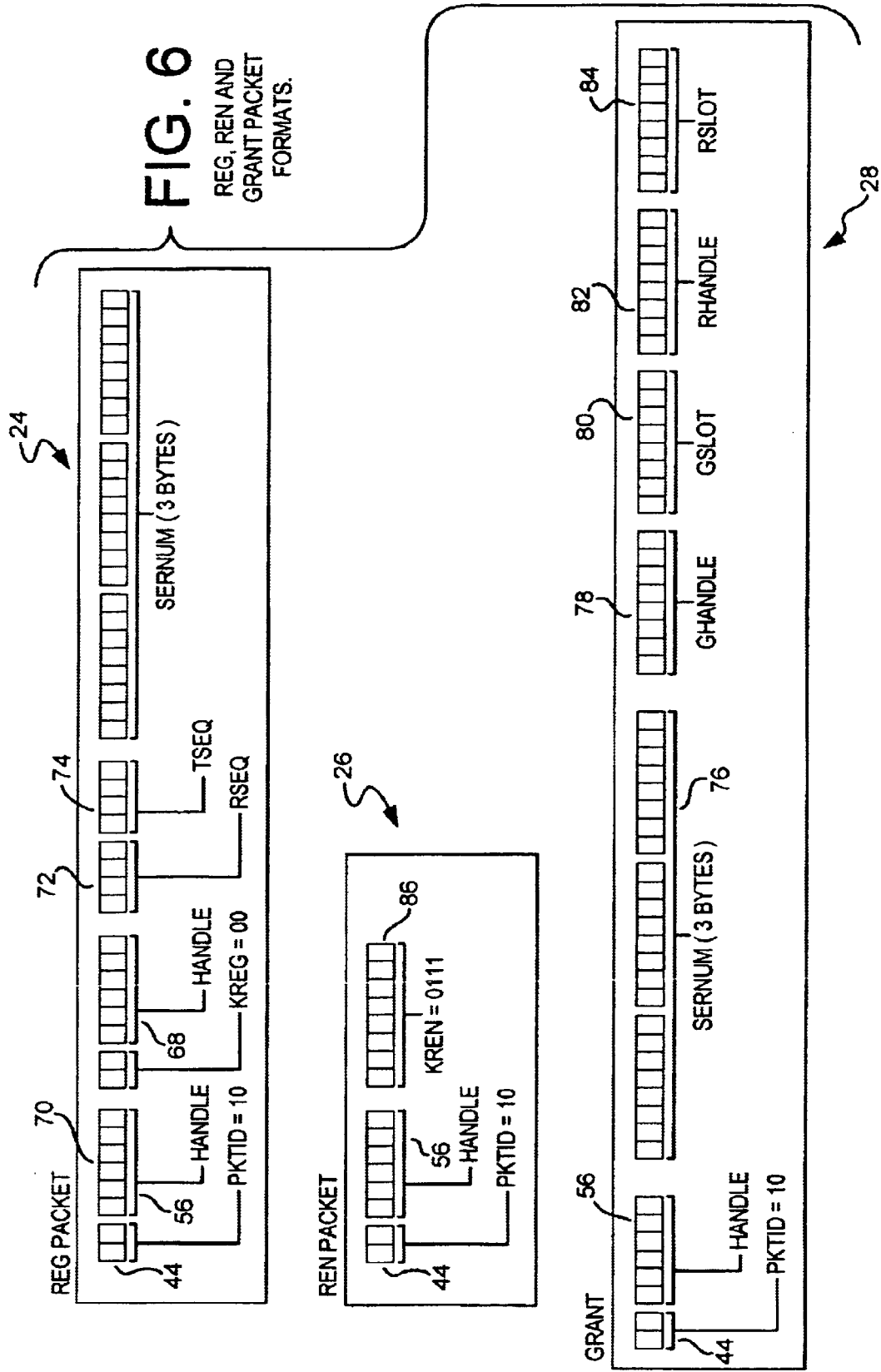
FIG. 6 REG, REN AND GRANT PACKET FORMATS.

METHOD AND SYSTEM FOR DATA TRANSMISSION IN A WIRELESS NETWORK

RELATED APPLICATIONS

This patent application claims the benefit of U.S. Provisional Patent application, entitled "Modulation Systems and Techniques," Ser. No. 60/191,723, filed Mar. 24, 2000.

TECHNICAL FIELD

The present invention is generally related to communication system protocols. More specifically, the present invention is directed to a radio protocol for a wireless network.

BACKGROUND OF INVENTION

In digital packet radio transceiver networks, there are several schemes for coordinating multiple radios to access a shared radio channel. One such scheme is time-division-multiple-access (TDMA). FIG. 1. In TDMA, each transmitting station is assigned a time slot within a repeating time frame, called a dwell period, during which only that station is allowed to transmit. In a star configured wireless network, a central base station is surrounded by one or more remote stations. As opposed to a peer-to-peer network configuration, remote stations are only allowed to communicate with the base station and not to each other. The sequence of transmission slots begins with a transmission by the base station which is received by all remote stations and followed by an individual transmission slot for each remote station. FIG. 2.

Digital communications networks often provide a facility for retransmitting defective or errant data messages. One common form of such error handling is automatic repeat-request, or ARQ. In ARQ, the transmitting station listens after every transmitted message for an acknowledgment (ACK) message from its recipient. If the originating station fails to receive the ACK message, the originally transmitted message is sent again, repeating until either the ACK is received or a predetermined number of attempts have been made, in which case the message is discarded.

SUMMARY OF THE INVENTION

The present invention includes various forms of messaging protocols or methods of transmitting and receiving data between radio stations in a multipoint TDMA digital wireless network that are optimized for use in a star configuration. A hierarchical messaging protocol is defined comprising of a number of different control and messaging packet formats. Packet types are defined that support a registration mechanism for controlling access of remote stations into and out of the network and support retransmission of defective or errant packets.

Accommodation is made for network control functions including both access control and retransmission of defective or lost packets. The present invention provides a TDMA protocol implementation having superior efficiency when used in small multipoint data networks. The implementation provides a compact method of handle assignment capable of mapping a 24-bit address into a 6-bit handle space. In addition, an ARQ is provided in which a very short sequence number is utilized for space efficiency. The various packet types are distinguishable from one another with minimal decoding effort.

One embodiment of the present invention is directed to a method for attaining access to a wireless communication network configured in a star layout utilizing a base station and a remote station wherein a packet frame is transmitted and received throughout the network. The remote station discovers the network and requests access to the network by transmitting a packet frame comprising a registration packet. The remote station is granted access to the network by the base station transmitting a packet frame comprising a grant packet. A temporary identifier is assigned to the remote station. The temporary identifier being a handle associated with the remote station for a predetermined number of dwell periods. The duration of the dwell period is monitored by the network during transmission of a broadcast packet. The remote station can request to extend its utilization of the temporary identifier within the network by transmitting a renewal request packet. If the remote station does not request an extension, the temporary identifier will be removed after a predetermined amount of time has passed.

Another embodiment of the present invention is directed to a protocol for a wireless communication network having a base station and a remote station. The network being configured in a star layout for transmitting and receiving a packet frame having a header, a trailer and a packet throughout the network. The protocol comprises a broadcast message, an acknowledge message, a data message, a registration request message, a renewal message and a grant message.

An object of the present invention is to provide an access control procedure defined by which a base station can both grant entry to a remote station and detect when the remote station exits the network. Each remote station has a unique factory-assigned identifier. To improve data transmission efficiency, a short identifier called a handle is assigned to each remote station when it enters the network for the purpose of distinguishing messages intended for or originating from that remote station.

Another object of the present invention is to provide an automatic repeat-request error control mechanism wherein each packet carries a sequence number that allows a remote receiving station to distinguish repeated packets from ones it may have already received. Each new data packet is assigned a distinct sequence number that is used when that packet is transmitted, however many times as may be required. Sequence numbers are not infinite in extent and must be recycled by the transmitting station for reuse.

Other advantages and aspects of the present invention will become apparent upon reading the following description of the drawings and detailed description of the invention.

DETAILED DESCRIPTION OF PREFERRED EMBODIMENT

Figure 1:
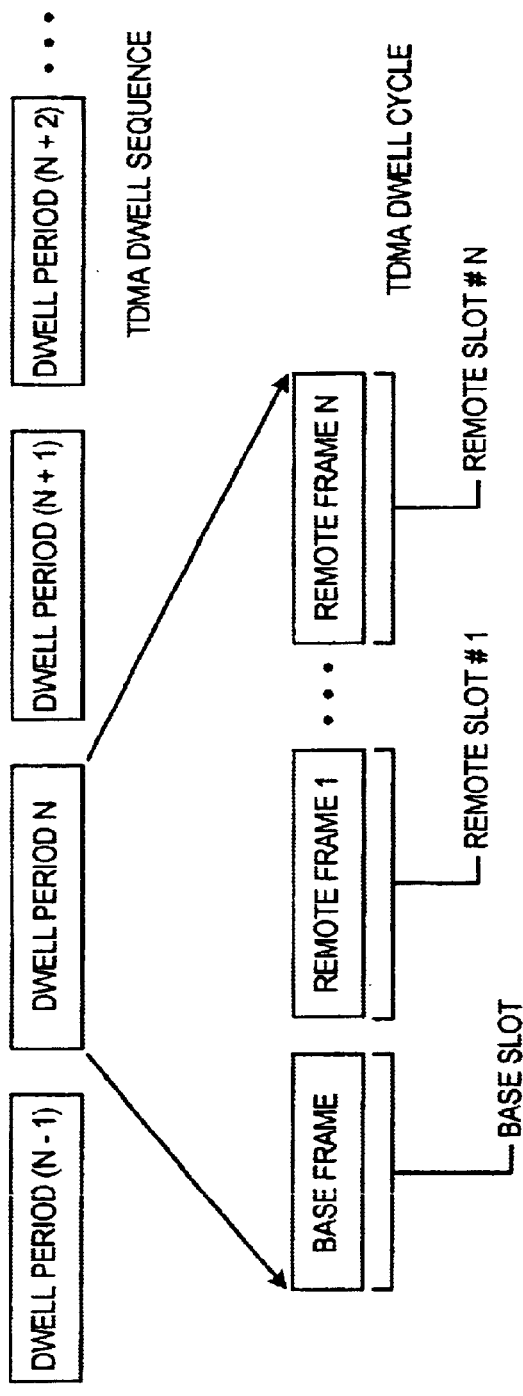
FIG. 1 depicts a TDMA transmission sequence showing a repeating slot structure to accommodate transmissions from a base station and remote stations.
Figure 2:
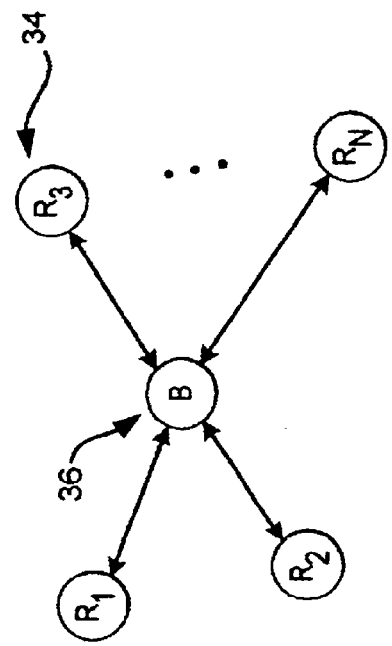
FIG. 2 depicts a star configuration TDMA network with a base station and a plurality of remote stations.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figure 3:
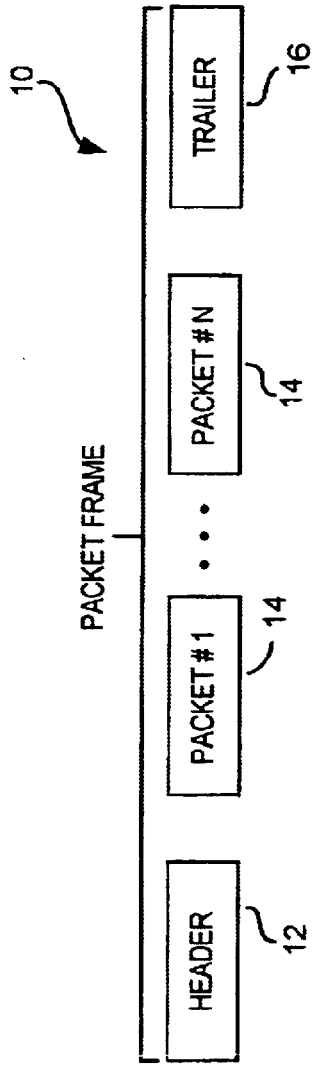
FIG. 3 depicts a structure for a packet frame transmitted by a radio, one packet frame is sent per time slot.

The largest element of transmission is the packet frame 10. As shown in FIG. 3, the packet frame 10 comprises a HEADER block 12, an individual data packet 14 and a TRAILER block 16. FIG. 3. Packets 14 may be of one of the following types: BCAST 18, ACK 20, DATA 22, REG 24, REN 26 or GRANT 28.

Figure 4:
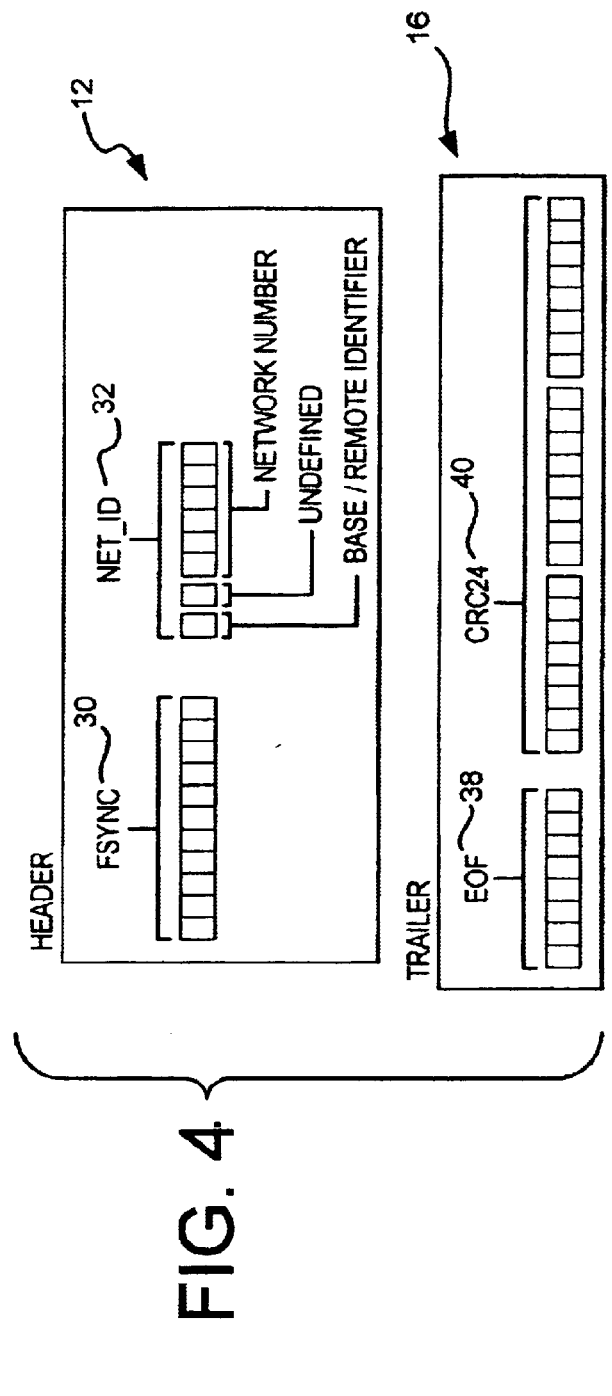
FIG. 4 depicts the data format of the HEADER and TRAILER portions of the packet frame depicted in FIG. 3.

As shown in FIG. 4, the HEADER portion 12 of the packet frame 10 is comprised of a synchronization word 30 (FSYNC) and a network identifier 32 (NET_ID). Detection of the FSYNC 30 by a remote receiving station 34 is used to establish the byte boundaries within the serial data stream. The NET_ID 32 consists of a bit field specifying whether the sending station is a base station 36 or a remote station 34 and a network number that is used as a means of distinguishing traffic from other networks that may happen to be deployed within radio range of one another.

The TRAILER portion 16 of the packet frame 10 has an end-of-frame flag 38 (EOF) and a 24-bit checksum 40 (CRC24).

The middle of the packet frame 10 includes one or more individual packets 14, that are described below.

Figure 5:
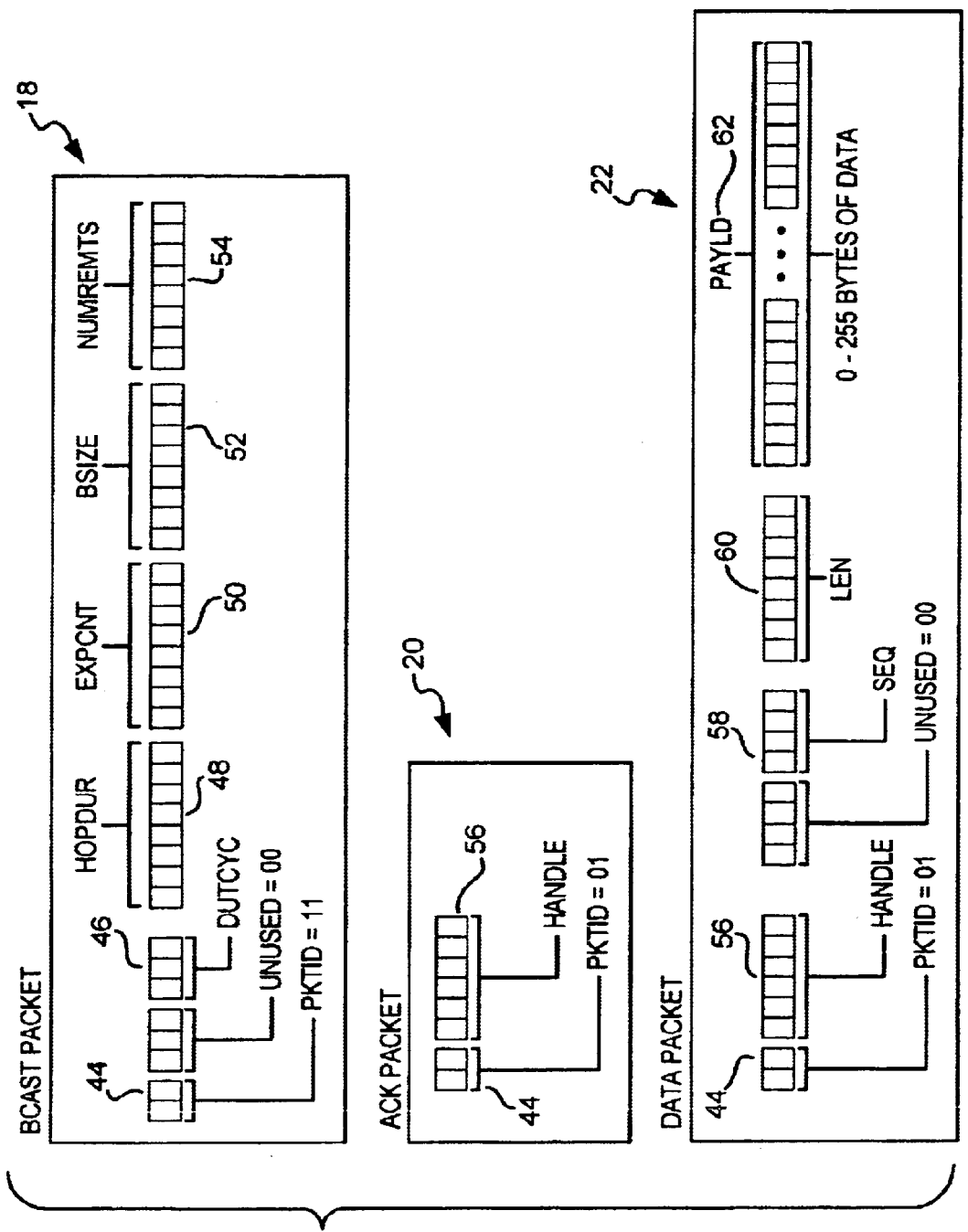
FIG. 5 depicts individual data formats for the BCAST, ACK and DATA packet types; and, FIG. 6 shows individual data formats for the registration, renewal and grant packet types.

As shown in FIG. 5, the BCAST packet 18 is a packet type sent only by the base station 36 and includes global information describing the system configuration and status of the network 42. The first byte consists of a packet identifier field 44 (PKT_ID), (for this packet type, the packet identifier field is set equal to eleven), to distinguish it from other kinds of packets 14, and a duty cycle-field 46 (DUTCYC) that specifies a duty cycle parameter for remote stations 34 that may wish to power down for some dwell periods in order to conserve power. The remaining four bytes constitute one field each. A HOPDUR field 48 specifies the length of the dwell period to be observed by all radios. An EXPCNT field 50 is a counter used for timing registration events. A BSIZE field 52 informs the remote stations 34 of the size of the time slot allocated to the base station 36, and a NUMRENTS field 54 declares how many remote stations 34 are currently in the network 42. After the base station 36 transmits, the remainder of the dwell period is divided equally among the remote stations and the NUMREMTS field 54 is used by the remote stations 34 to determine how many segments the dwell period should be divided.

Also as shown in FIG. 5, a DATA packet 22 is used to carry higher-level application data. A HANDLE field 56 specifies which remote station 34 the data is intended for, or which remote station 34 the data originated with, depending on whether the base station 36 or one of the remote stations 34 is the station transmitting the data. A SEQ field 58 is an ARQ sequence number. A LEN field 60 specifies the number of bytes in the payload portion 62 of the packet. The payload 62 (PAYLD) itself consists of 0–255 bytes of application data as specified by the LEN field 60.

As further shown in FIG. 5, the ACK packet 20 is an ARQ acknowledgment used to inform an originating station that a DATA packet 22 was successfully received. As in the data packet 22, the HANDLE field 56 specifies which remote the DATA packet 22 originated with or was intended for, depending on whether the base station 36 or one of the remote stations 34 was the originating station.

The REG 22, REN 26 and GRANT 28 packet types, FIG. 6, pertain to the access control mechanism. The process begins when a remote station 26 discovers the network 42 and requests permission to enter from the base station 34 in the form of a REG packet 22. If the base station 34 decides to admit the remote station 36, it transmits a GRANT packet 28 which assigns the remote station 34 a temporary identifier called a HANDLE 56. The HANDLE 56 is provided to the remote station 34 for a time period equal to 256 dwell periods, that is kept track of through the EXPCNT field 50 broadcast by the base station 36 in a BCAST packet 18 during every dwell period. During this period the remote station 34 must at some point request permission to continue using the handle 56 in the form of a renewal request 26 (REN packet). The base station 34 responds to this request with a GRANT packet 28 to renew the handle 56 for another 256 dwell periods. If a remote station 34 should fail to renew its registration, it is considered to have left the network 42 and its handle 56 is retired by the base station 36.

The REG packet type 24 is a registration packet from a remote station 34 requesting access to the network 42 from the base station 36. FIG. 6. The HANDLE field 56 in this case is a requested handle that the remote station 34 would like assigned if it is not already in use by another remote station. A KREG field 68 is a placeholder and is always zeros. A LASTNET field 70 informs the base station 36 what previous network 42 the remote station 34 requesting access may have belonged. A RSEQ 72 field and a TSEQ 74 field are initial values for receive and transmit ARQ sequence numbers to be used when communicating with that remote station 34. The last field, SERNUM, 76 includes the remote station's factory-assigned unique identifier.

The GRANT packet type 28 is sent by the base station 36 to grant permission to a remote station 34 to enter the network 42 and to renew registration for an existing remote station, both of which operations may take place concurrently, if necessary. A GHANDLE 78 field specifies the handle that is being assigned to a new remote station 34. The SERNUM field 76 specifies the unique serial number of the new remote station 34 that is being granted permission. A GSLOT field 80 specifies which time slot the remote station 34 is allowed to use. A RHANDLE field 82 specifies a remote station 34 whose handle has been renewed by the base station 36, and RSLOT 84 specifies the time slot that is assigned to that renewing remote station 34.

REN packets 26 are renewal requests sent by a remote station 34 to the base station 36 requesting permission to continue using its handle. The HANDLE field is the handle of the remote station 34 making the request. A KREN 86 field is a constant used by the base station 36 to distinguish REN packets 26 from REG packets 24, since both packets can share the same PKT_ID 44, e.g., shown to be ten for exemplification purposes.

The foregoing formats may be transmitted using conventional star network system components that may be adapted in conventional fashion to accommodate these formats. The formats may be modified and changed to accommodate the purposes of this invention without departing from its scope or spirit.

While the specific embodiment has been illustrated and described, numerous modifications come to mind without significantly departing from the spirit of the invention, and the scope of protection is only limited by the scope of the accompanying claims.

I claim:

1. A method for attaining access to a wireless communication network configured in a star layout utilizing a base station and a remote station wherein a packet frame is transmitted and received throughout the network, the method comprising the steps of:

discovering the network;

requesting access to the network by transmitting a registration packet;

granting access to the network by transmitting a grant packet;

assigning a temporary identifier to the remote station, the temporary identifier being associated with the remote station for a predetermined number of dwell periods;

monitoring the dwell periods during a transmission of a broadcast packet;

requesting to extend the use of the temporary identifier by transmitting a renewal request packet from the remote station, the requesting to extend the use of the temporary identifier further comprising:

providing a handle field populated with the temporary identifier of the remote station requesting renewal of its temporary identifier; and, providing a renewal constant, the renewal constant being utilized by the base station to distinguish the renewal packet from the registration packet;

granting the request to extend the use of the temporary identifier; and, removing the temporary identifier.

2. The method of claim 1 wherein the registration packet comprises:

a packet identifier;

a request handle;

a serial number field including a factory assigned identifier;

a previous network identifier representing a previous network accessed by the remote station;

a receive sequence number for cooperating with an automatic-repeat request message utilized to ensure delivery of the registration packet during network communication with the remote station; and, a transmit sequence number for cooperating with the automatic-repeat request message utilized to ensure delivery of the registration packet during network communication with the remote station.

3. The method of claim 2 wherein the granting access to the remote station to enter the network comprises:

assigning a new handle to the remote station;

assigning a serial number field to the remote station, the serial number field comprising a unique serial number to the remote station; and, assigning a time slot to be utilized by the remote station during network communication.

4. A protocol for a wireless communication network having a plurality of stations including a base station and a plurality of remote stations, the network being configured in a star layout for transmitting and receiving a plurality of packets of information throughout the network, the protocol comprising:

a broadcast message packet for providing global information of a network's configuration and status, the broadcast message packet being exclusively transmitted from the base station;

an acknowledge message packet for informing a transmitting station that a one of a plurality of packets of information was successfully received;

a data message packet for providing a higher-level application data;

a registration request message packet for requesting access to the network, the registration packet being sent from a one of the plurality of remote stations;

a grant message packet for granting access to the network, the grant packet being transmitted from the base station to the one of the plurality of remote stations; and, a renewal message packet for requesting renewal of access to the network.

5. The protocol of claim 4 wherein the broadcast message packet comprising:

a packet identifier field for distinguishing the broadcast message packet from the plurality of packets of information;

a duty cycle field for specifying a duty cycle parameter for the plurality of remote stations to power down during a dwell period;

a dwell length field for specifying a length of the dwell period to be utilized by the plurality of remote stations;

a timing field for timing registration events;

a time slot field for communicating a size of a time slot to the plurality of remote stations; and, a partition field for determining an amount of sections the dwell period should be partitioned.

6. The protocol of claim 4 wherein the data message packet comprises;

a handle field for specifying a one of the plurality of remote stations the data message packet is received from or destined for;

a sequence field having an automatic repeat-request sequence number;

a payload field; and, a length field for specifying a number of bits in the payload field, the payload field ranging from 0–255 bytes as specified by the length field.

7. The protocol of claim 4 further comprising an access control packet selected from the group consisting of registration, renewal and grant packets.

8. The protocol of claim 7 wherein the registration packet comprises:

a packet identifier field;

a handle field for requesting a handle preferred by a one of the plurality of remote stations;

a previous network field for informing the base station of the previous network to which the one of the plurality of remote stations requesting access may have belonged;

a receive sequence field being set to an initial value for a receive automatic repeat-request sequence number to be utilized for communication with the one of the plurality of remote stations;

a transmit sequence field being set to an initial value for a transmit automatic repeat-request sequence number to be utilized for communication with the one of the plurality of remote stations; and, a serial number field comprising a factory assigned unique identifier for the one of the plurality of remote stations.

9. The protocol of claim 7 wherein the grant packet comprising:

a packet identifier;

a serial number field for specifying a unique serial number associated with the one of the plurality of remote stations being granted permission to access the network;

a grant handle field for specifying a handle being assigned to the one of a plurality of remote stations;

a grant slot field for specifying a time slot utilized by the one of a plurality of remote stations;

a renewal handle field for specifying the one of the plurality of remote stations renewed by the base station; and, a renewal slot field for specifying a renewal time slot assigned to the renewed one of the plurality of remote stations.

10. The protocol of claim 7 wherein the renewal packet comprises:

a handle field comprising a handle identifier of a one of the plurality of remote stations transmitting the renewal request; and, a constant field having a constant utilized by the base station to distinguish the renewal packet from the registration packet.

11. The protocol of claim 4 wherein each of the plurality of packets of information comprises:

a header having a first byte and a second byte, the second byte further including a station identifier and a network number; and, a trailer having an end-of-file (EOF) byte and a 24 bit checksum.

* * * * *